(12) United States Patent
Shepherd

(10) Patent No.: US 11,351,966 B2
(45) Date of Patent: Jun. 7, 2022

(54) REDUCED ARC WINDSHIELD WIPER SYSTEM FOR A VEHICLE

(71) Applicant: Siemens Mobility, Inc., New York, NY (US)

(72) Inventor: Richard Shepherd, Sacramento, CA (US)

(73) Assignee: Siemens Mobility, Inc., New York, NY (US)

( * ) Notice: Subject to any disclaimer, the term of this patent is extended or adjusted under 35 U.S.C. 154(b) by 195 days.

(21) Appl. No.: 16/485,255

(22) PCT Filed: Feb. 22, 2018

(86) PCT No.: PCT/US2018/019094
§ 371 (c)(1),
(2) Date: Aug. 12, 2019

(87) PCT Pub. No.: WO2018/160421
PCT Pub. Date: Sep. 7, 2018

(65) Prior Publication Data
US 2019/0375376 A1    Dec. 12, 2019

Related U.S. Application Data

(60) Provisional application No. 62/466,057, filed on Mar. 2, 2017.

(51) Int. Cl.
*B60S 1/34* (2006.01)
(52) U.S. Cl.
CPC .......... *B60S 1/3404* (2013.01); *B60S 1/3409* (2013.01); *B60S 1/3497* (2013.01);
(Continued)

(58) Field of Classification Search
CPC .... B60S 1/42; B60S 1/24; B60S 1/245; B60S 1/34; B60S 1/18; B60S 1/36; B60S 1/3409; B60S 1/3406; B60S 1/44
(Continued)

(56) References Cited

U.S. PATENT DOCUMENTS

| | | | | |
|---|---|---|---|---|
| 4,622,711 | A * | 11/1986 | Wattier | B60S 1/42 |
| | | | | 15/250.23 |
| 7,203,990 | B2 * | 4/2007 | Mayer | B60S 1/32 |
| | | | | 15/250.31 |
| 2006/0265831 | A1 * | 11/2006 | Lindkvist | B60S 1/3409 |
| | | | | 15/250.23 |

FOREIGN PATENT DOCUMENTS

| | | | | |
|---|---|---|---|---|
| EP | 0779191 A1 * | 6/1997 | ............ | B60S 1/3406 |
| EP | 1176069 A2 | 1/2002 | | |

(Continued)

OTHER PUBLICATIONS

PCT International Search Report and Written Opinion of International Searching Authority dated Jun. 4, 2018 corresponding to PCT International Application No. PCT/US2018/019094 filed Feb. 22, 2018.

*Primary Examiner* — Katina N. Henson

(57) ABSTRACT

A windshield wiper system includes a pivoting wiper arm (110), a wiper blade (120) for wiping a surface (102), and a connector assembly (130) coupling the pivoting wiper arm (110) to the wiper blade (120). The connector system (130) includes a first connecting member (140) directly coupled to the wiper arm (110) and a second connecting member (150) directly coupled to the wiper blade (120). The first connecting member (140) and the second connecting member (150) are movably coupled to each other, wherein a position of the first connecting member (140) relative to the second connecting member (150) is based on an angular position of the pivoting wiper arm (110).

8 Claims, 6 Drawing Sheets

(52) U.S. Cl.
CPC ..... *B60Y 2200/143* (2013.01); *B60Y 2200/31* (2013.01); *B60Y 2200/50* (2013.01)

(58) Field of Classification Search
USPC .......................... 15/250.21, 250.29, 250.351
See application file for complete search history.

(56) References Cited

FOREIGN PATENT DOCUMENTS

| | | |
|---|---|---|
| EP | 2377732 A1 | 10/2011 |
| JP | S60500130 A | 1/1985 |
| JP | 2004009824 A | 1/2004 |
| JP | 2007513011 A | 5/2007 |
| JP | 2008513272 A | 5/2008 |
| WO | 8402313 A1 | 6/1984 |
| WO | 2005054019 A1 | 6/2005 |
| WO | 2016174293 A1 | 11/2016 |

* cited by examiner

REDUCED ARC WINDSHIELD WIPER SYSTEM FOR A VEHICLE

CROSS REFERENCE TO RELATED APPLICATIONS

This application is the U.S. national stage of International application no. PCT/US2018/019094 filed 22 Feb. 2018, and claims benefit of U.S. provisional application No. 62/466,057 filed 2 Mar. 2017 in the United States Patent and Trademark Office, the content of which is herein incorporated by reference in its entirety.

BACKGROUND

1. Field

Aspects of the present disclosure relate to a reduced arc windshield wiper system which can be utilized in connection with many different types of vehicles. A vehicle as used herein is a motorized or non-motorized vehicle and can be for example a railed vehicle, a motor vehicle, a watercraft or an aircraft.

2. Description of the Related Art

A windshield wiper, also referred to as surface wiper, is a device used to remove rain, snow, ice and debris from a surface such as a windshield. Almost all vehicles, including motor vehicles such as cars and trucks, railed vehicles such as train locomotives, watercraft and some aircraft, are equipped with such wipers which are usually a legal requirement.

A wiper generally comprises a wiper arm, pivoting at one end and with a long wiper blade attached close to the other end of the wiper arm. The wiper arm is powered by a motor, often an electric motor, although pneumatic power is also used in some vehicles. The wiper blade rotates back and forth over the windshield pushing water or other precipitations from its surface. A speed of the wiper arm is normally adjustable, with several continuous speeds and often one or more intermittent settings. Most automobiles use two synchronized radial type arms, while many commercial vehicles use one or more pantograph arms.

SUMMARY

A first aspect of the present disclosure provides a windshield wiper system comprising: a pivoting wiper arm; a wiper blade for wiping a surface; and a connector assembly coupling the pivoting wiper arm to the wiper blade, the connector system comprising a first connecting member directly coupled to the wiper arm and a second connecting member directly coupled to the wiper blade, wherein the first connecting member and the second connecting member are movably coupled to each other, and wherein a position of the first connecting member relative to the second connecting member is based on an angular position of the pivoting wiper arm.

A second aspect of the present disclosure provides a vehicle comprising a windshield wiper system as described herein.

DETAILED DESCRIPTION

To facilitate an understanding of embodiments, principles, and features of the present disclosure, they are explained hereinafter with reference to implementation in illustrative embodiments. In particular, they are described in the context of being a windshield wiper system for a vehicle. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Known windshield wiper systems include wiper arms that may leave unwiped zones. For example, current wiper systems may trace out a motion path that has a high arc in a center area of the windshield which tends to leave visibility poor where it is needed most, in the center area, particularly in a lower center area of the windshield.

The present disclosure provides an improved windshield wiper system, specifically a reduced arc windshield wiper system, which can be utilized in connection with many different types of vehicles. By altering a position, specifically a height, of a wiper blade as the wiper blade goes through a motion path (during a wiper stroke), an arc made by the wiper blade can be reduced or lowered, thereby leaving less unwiped zones, in particular within the lower center area of the windshield and improving visibility.

Figure 1:
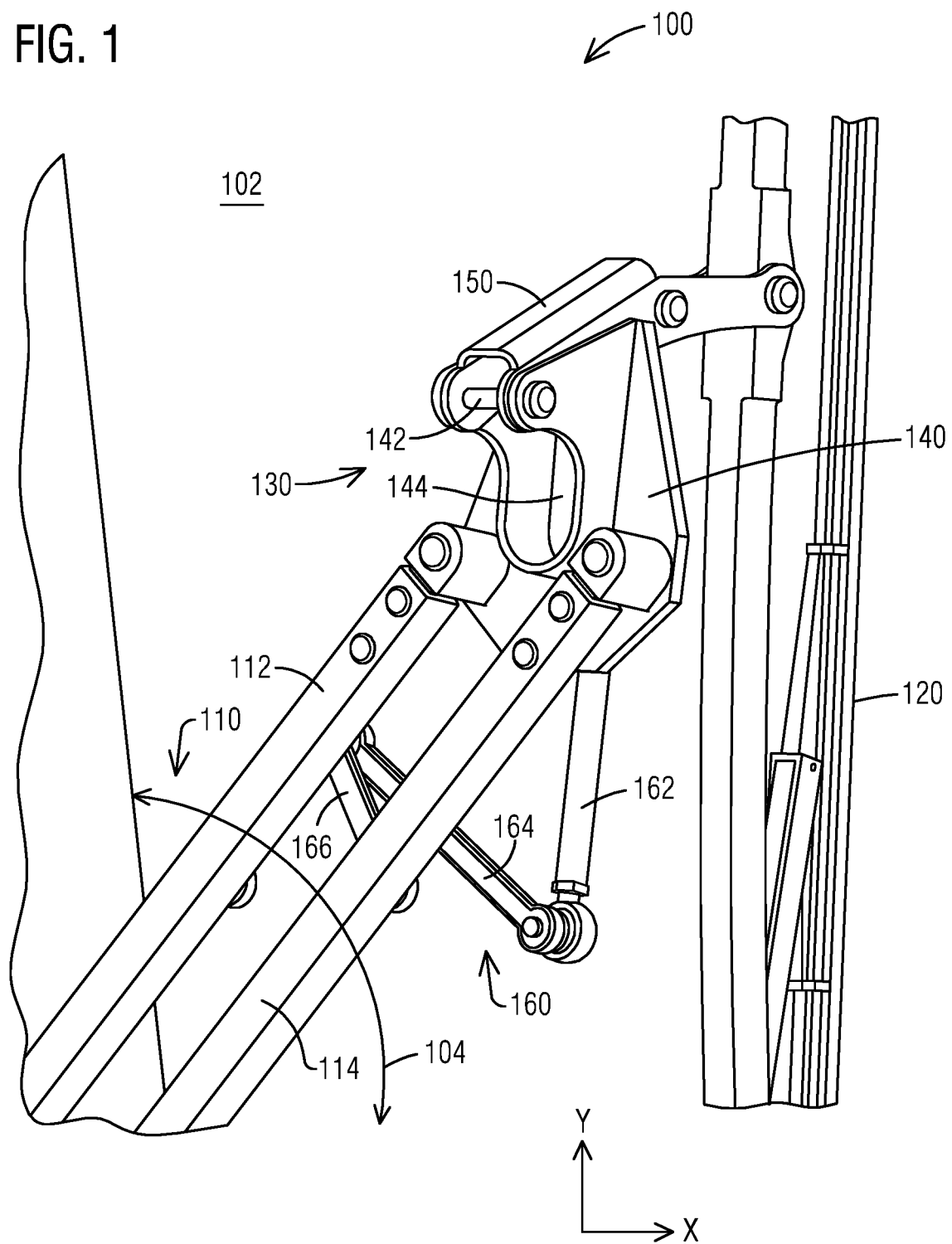
FIG. 1 illustrates a first perspective view of a windshield wiper system in accordance with an exemplary embodiment of the present disclosure.
Figure 2:
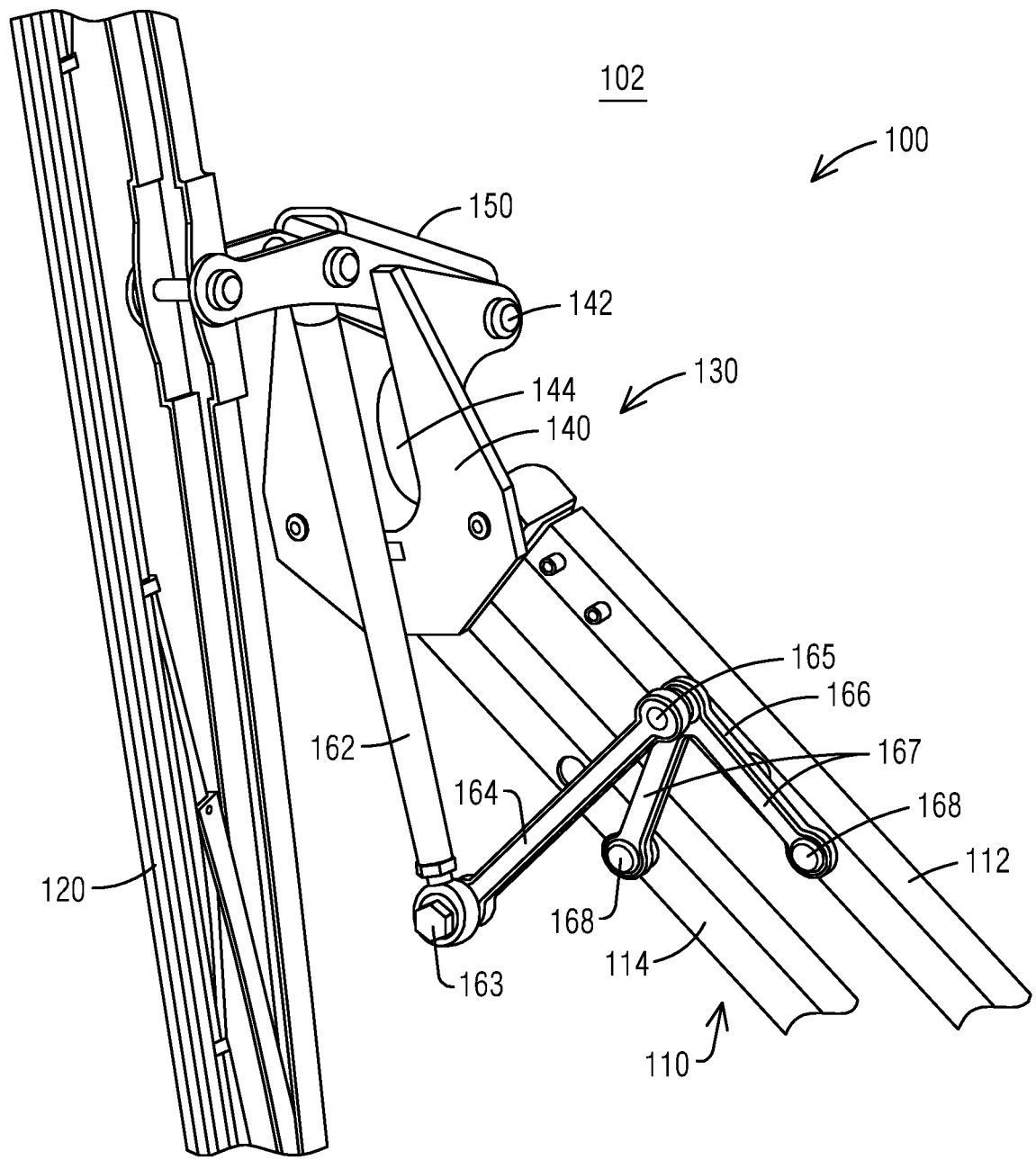
FIG. 2 illustrates a second perspective view of a windshield wiper system in accordance with an exemplary embodiment of the present disclosure.

FIG. 1 and FIG. 2 illustrate first and second perspective views of a windshield wiper system 100 in accordance with exemplary embodiments of the present disclosure.

The windshield wiper system 100 comprises a pivoting wiper arm 110 and a wiper blade 120 for wiping a surface 102. The surface 102 is a windshield of a vehicle, for example a windshield of a railway vehicle. A connector assembly 130 couples the pivoting wiper arm 110 to the wiper blade 120. The connector assembly 130 comprises a plurality of connecting members including a first connecting member 140, a second connecting member 150 and a third connecting member 160.

The first connecting member 140 is on one end directly coupled to the wiper arm 110. The second connecting member 150 is on one end directly coupled to the wiper blade 120. The first connecting member 140 and the second connecting member 150 are on the other ends, respectively, movably coupled to each other, wherein a position of the first connecting member 140 relative to the second connecting member 150 is based on (or is dependent on) an angular position of the pivoting wiper arm 110 (see also angle a in FIG. 3). Specifically, the position of the first connecting member 140 relative to the second connecting member 150 changes based on the (changing) angular position of the pivoting wiper arm 110 during a wiper stroke 104, because the angular position of the pivoting wiper arm 110 changes during the stroke 104.

A wiper stroke 104 as used herein includes a cycle of a reciprocating swinging movement of the wiper arm 110 with the wiper blade 120, when the wiper system 100 is in operation. The pivoting wiper arm 110 moves from one side of the (windshield) surface 102 to the other, wherein a cycle of the reciprocating swinging movement includes one such movement of the wiper arm 110 from one side to the other.

Figure 3:
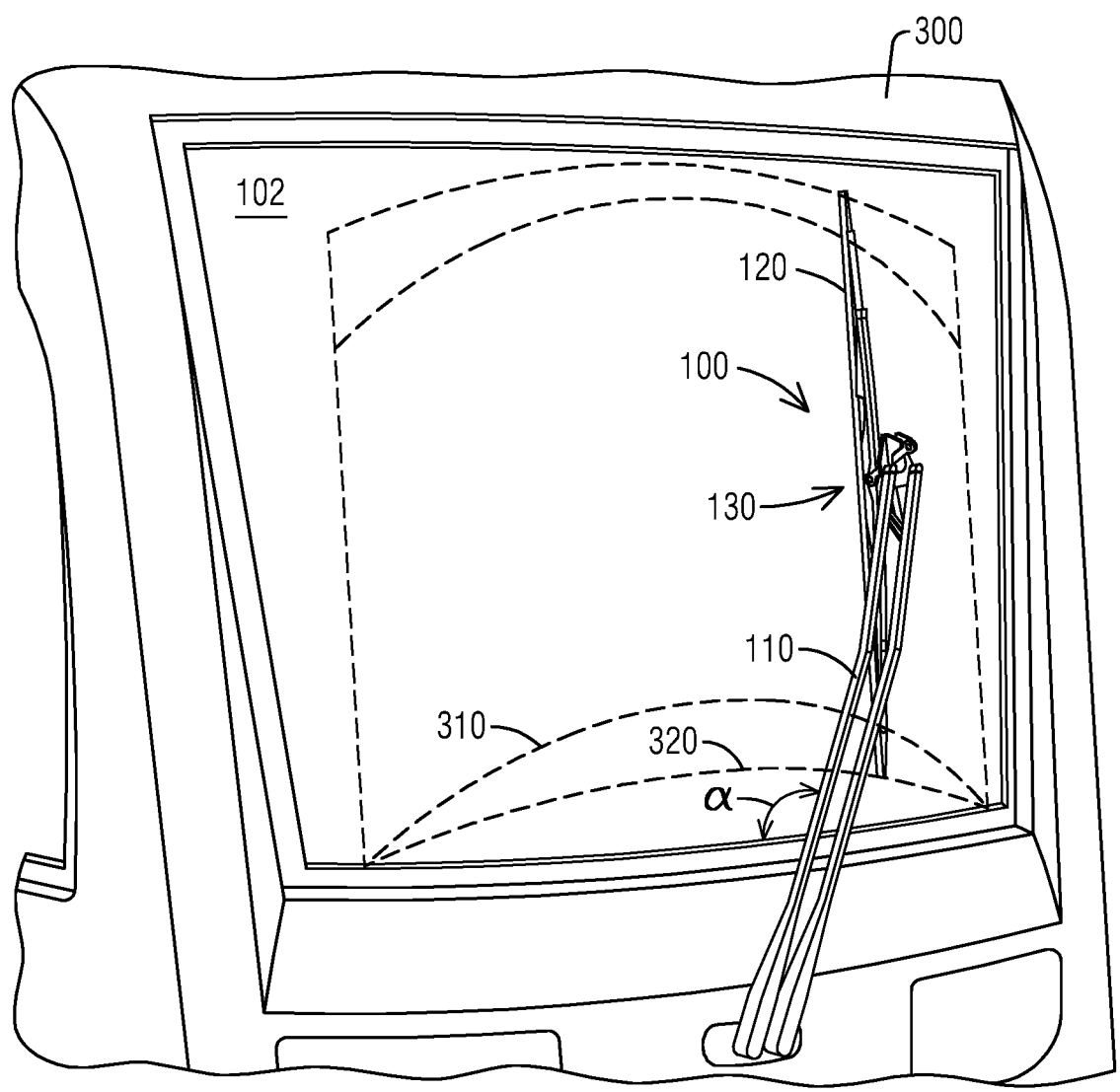
FIG. 3 illustrates a perspective view of a section of a railway vehicle including a windshield wiper system in accordance with an exemplary embodiment of the present disclosure.

More specifically, the angular position of the pivoting wiper arm 110 alters a height of the wiper blade 120 during the wiper stroke 104 such that an arc of a motion path 320 of the wiper blade 120 is reduced (see FIG. 3). A height of the wiper blade 120 is used herein as position of the wiper blade 120 on the surface 102 in a vertical direction Y. The position of the wiper blade 120 in the vertical direction Y is reduced or lowered, so that the wiper blade 120 provides more coverage in a lower center area of the surface 102 during the stroke 104.

In an exemplary embodiment, the wiper arm 110 comprises a first arm member 112 and a second arm member 114, arranged in parallel. The first connecting member 140 is coupled to both arm members 112, 114. It should be noted that the wiper arm 110 may only comprise one arm member, wherein the first connecting member 140 would then only be connected to the one arm member.

With further reference to FIG. 1 and FIG. 2, the first connecting member 140 comprises substantially a U-shape, wherein opening 144 of the U faces upwards (in vertical direction Y). The second connecting member 150 is configured such that it can move or slide into the opening 144 of the U of the first connecting member 140 during the wiper stroke 104. The second connecting member 150 can be configured as elongated link, herein also referred to as blade height link 150.

The first and second connecting members 140, 150 a movably coupled to each other by coupling link 142, which can be for example a bolt or a rod or a shaft. The coupling link 142 comprises an axis extending in horizontal direction X and may be described as a type of a bearing for the connecting members 140, 150, since both first and second connecting members 140, 150 rotate around the axis of the coupling link 142 during the wiper stroke 104. By rotating around the axis of the coupling link 142, the first and second connecting members 140, 150 change position(s) relative to each other.

The connector assembly 130 further comprises third connecting member 160 coupled between the second connecting member 150 and the wiper arm 110. The third connecting member may be seen best in FIG. 2. The third connecting member 160 provides support and stability between the second connecting member 150 and the wiper arm 110, especially during movement of the wiper arm 110. Further, the third connecting member 160 pushes or pulls the second connecting member 150 during wiper strokes.

With further reference to FIG. 2, the third connecting member 160 comprises multiple components including a connecting rod 162, a swing link 164, and a V-link 166, the swing link 164 being movably coupled between the connecting rod 162 and the V-link 166. The V-link 166 comprises two V-link members 167 (that form the 'V'), wherein one V-link member 167 is coupled to arm member 112, and the other V-link member 167 is coupled to arm member 114 of the wiper arm 110, for example by bolts 168. The V-link members 167 are able to rotate around an axis of the bolts 168 during the wiper stroke 104.

The swing link 164 is coupled to the V-link 166 on one end and coupled to the connecting rod 162 at the other end. Connections 163, 165 between swing link 164 and V-link 166 and swing link 164 and connecting rod 162 are such that the swing link 164 can swing or pivot during wiper strokes 104.

FIG. 3 illustrates a perspective view of a section of a vehicle 300 including a windshield wiper system 100 in accordance with an exemplary embodiment of the present disclosure.

The vehicle 300 can be a motorized or non-motorized vehicle such as for example a railway vehicle, a motor vehicle including cars, coaches and busses, a watercraft, an aircraft, a spacecraft etc. The embodiments disclosed herein are primarily described in connection with railway vehicles, such as for example streetcars, light rail vehicles, automatic (airport) shuttles, metros, commuter trains, EMUs (Electric Multiple Units), DMUs (Diesel Multiple Unit), and high-speed trains etc.

The vehicle 300 comprises windshield wiper system 100 as described in detail with reference to FIG. 1 and FIG. 2. The windshield wiper system 100 comprises pivoting wiper arm 110 and a wiper blade 120 for wiping the surface 102. The surface 102 is a windshield of the vehicle 300. A connector assembly 130 couples the pivoting wiper arm 110 to the wiper blade 120.

FIG. 3 illustrates a conventional motion path 310 of a conventional wiper system and a reduced arc motion path 320 of the improved wiper system 100 as disclosed herein. During wiper strokes 104, the wiper arm 110 moves the wiper blade 120 in horizontal direction X (i.e. from one side of the windshield surface 102 to the other side) as well as in vertical direction Y which creates the motion path 320.

The wiper system 100 is configured in such a way that the motion path 320 of the wiper blade 120 is modified and comprises a reduced arc compared to an arc of the conventional motion path 310. Such modification and reduction of the arc of the motion path 320 is achieved by the connector assembly 130 that couples the wiper arm 110 to the wiper blade 120.

An angular position of the pivoting wiper arm 110, based on angle α, alters a height of the wiper blade 120 of the connector assembly 130 during the wiper stroke 104 such that the arc of the motion path 320 is reduced. A height of the wiper blade 120 is used herein as position of the wiper blade 120 on the surface 102 in a vertical direction Y. A position of the wiper blade 120 in the vertical direction Y is reduced or lowered, so that the wiper blade 120 provides more coverage in a lower center area of the surface 102 during the stroke 104.

Figure 4:
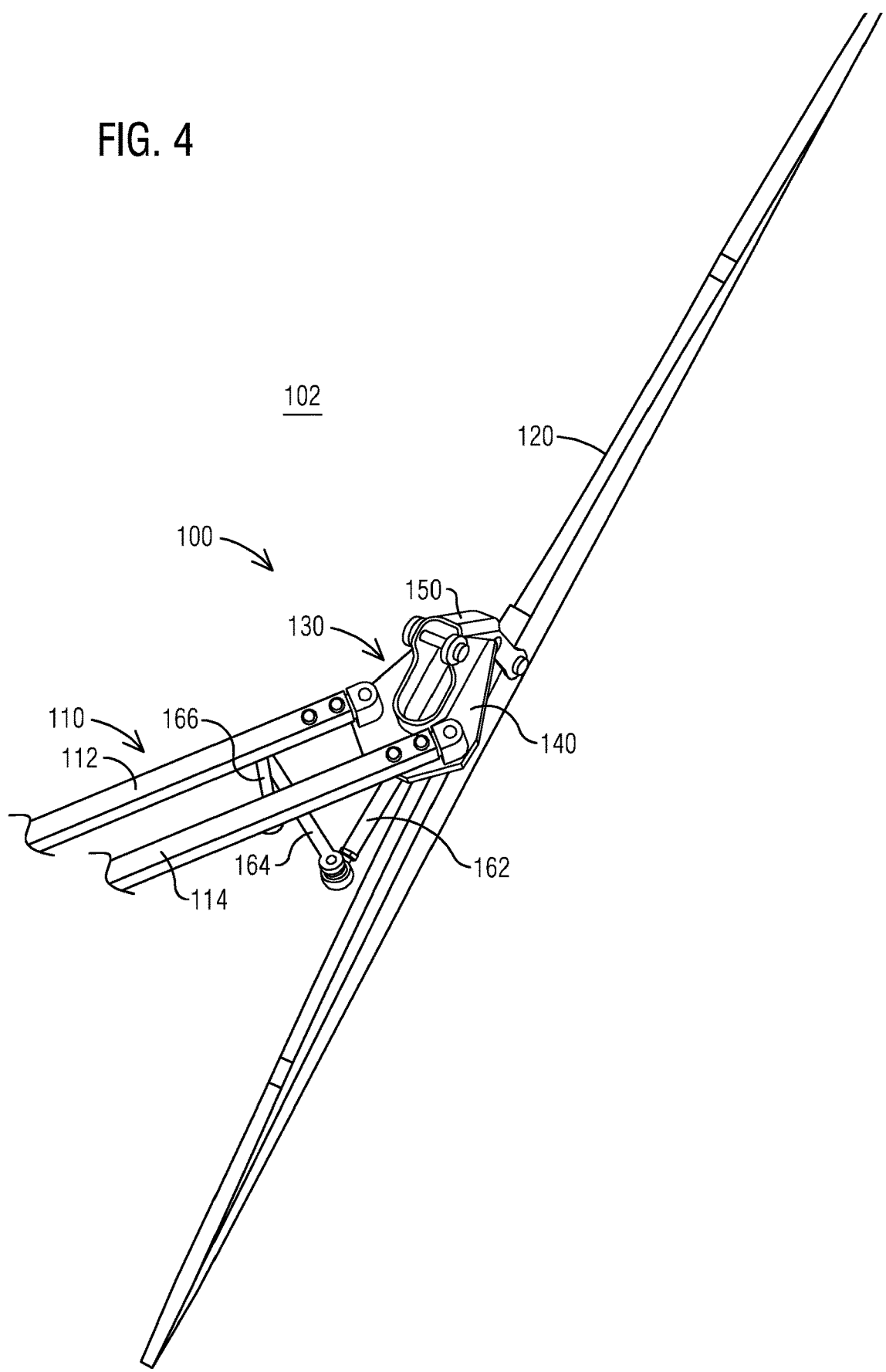
FIG. 4 to FIG. 6 illustrate multiple perspective views of a windshield wiper system in different positions in accordance with exemplary embodiments of the present disclosure.
Figure 5:
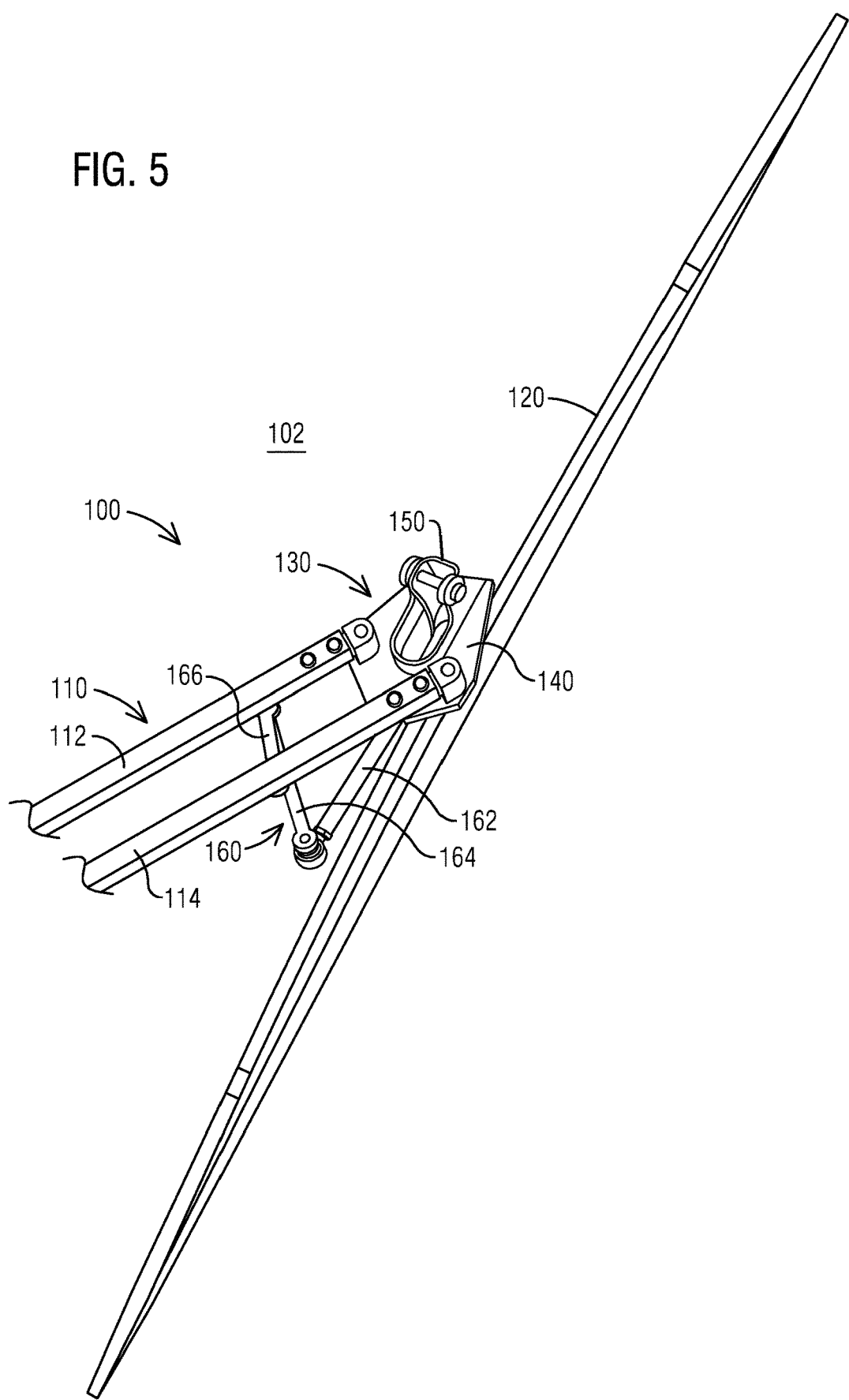
Figure 6:
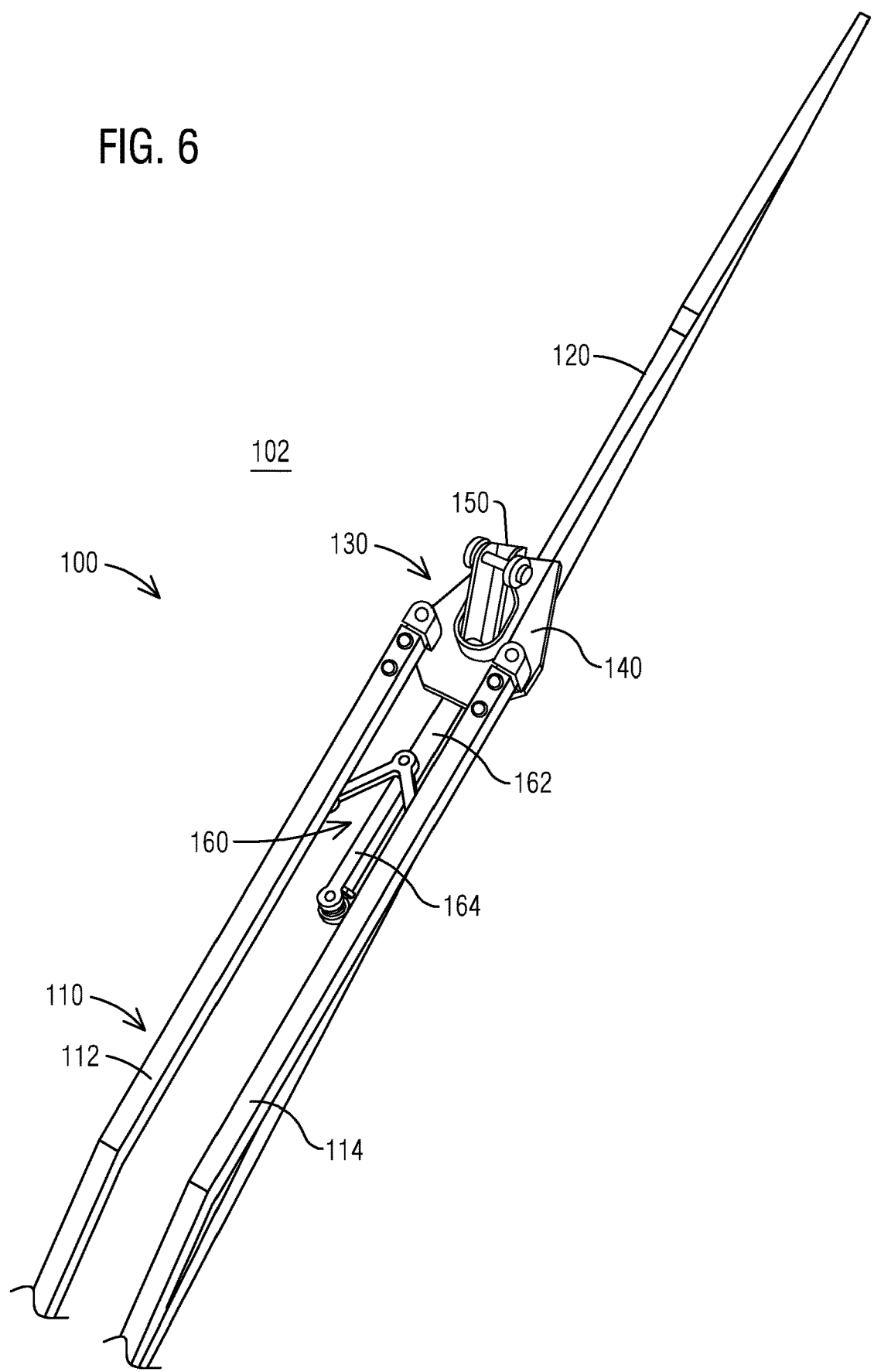

FIG. 4 to FIG. 6 illustrate multiple perspective views of the windshield wiper system 100 in different positions in accordance with exemplary embodiments of the present disclosure.

FIG. 4 illustrates the wiper system 100 in a parked position. In the parked position, the wiper arm 110 and the swing link 164 of the third connecting member 160 are at their furthest angle (see angle α of FIG. 3). First connecting member 140 and second connecting member 150, coupled by the link 142, are furthest apart from each other. The second connecting member 150 is outside the opening 144 of the U of the U-shaped first connecting member 140.

With reference to FIG. 5, after the wiper stroke 104 has stared and during the wiper stroke 104, the first and second connecting members 140, 150 move closer to each other, wherein the second connecting member 150 moves or slides into the opening 144 of the U of the U-shaped member 140.

Further, the connecting rod 162 pulls the second connecting member (blade height link) 150 in vertical direction Y to its lowest position (downward) which is reached when the wiper blade 120 is in center position on the surface 102. As the wiper arm members 112, 114 of wiper arm 110 move toward the center of the surface 102, they align with the wiper blade 120. The swing link 164 also aligns with the wiper blade 120 thereby pulling the blade height link 150 downward.

FIG. 6 illustrates the wiper system 100 in the center position. By the time the wiper blade 120 is centered on the windshield surface 102, the wiper arm 110, wiper blade 120, connecting rod 162 and swing link 164 are aligned. The connecting rod 162 has pulled the wiper blade 120 to its lowest position (relative to the first connecting member 140) in vertical direction Y to provide good wiping coverage in the lower center area of the windshield surface 102. After the wiper blade 120 has passed the center position and during movement of the wiper blade 120 toward the side(s) of the windshield surface 102, the connecting rod 162 pushes the second connecting member (blade height link) 150 to its highest position (upward) in vertical direction Y.

Using the improved wiper system 100, the movement of the wiper blade 120 in vertical direction Y is modified (the vertical movement is less or reduced), because part of the vertical movement is transferred from the wiper blade 120 to the connector assembly 130. Thus, more wiper coverage is provided in the lower center area of the surface 102 which improves visibility for operator(s) of the vehicle 300.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

The invention claimed is:

1. A windshield wiper system comprising:
a pivoting wiper arm;
a wiper blade for wiping a surface; and
a connector assembly coupling the pivoting wiper arm to the wiper blade, the connector assembly comprising a first connecting member directly coupled to the wiper arm and a second connecting member directly coupled to the wiper blade,
wherein the first connecting member and the second connecting member are movably coupled to each other, and wherein a position of the first connecting member relative to the second connecting member is based on an angular position of the pivoting wiper arm,
wherein the first connecting member is substantially U-shaped with an opening,
wherein the second connecting member is configured such that the second connecting member moves in and out the opening during a wiper stroke, wherein, in a parked position, the second connecting member is outside the opening of the U-shaped first connecting member,
wherein the connector assembly further comprises a third connecting member coupled between the second connecting member and the wiper arm,
wherein the third connecting member comprises a connecting rod, a swing link, and a V-link, the swing link movably coupled between the connecting rod and the V-link,
wherein the V-link comprises V-link members,
wherein the wiper arm comprises a first arm member and a second arm member, and
wherein the V-link members are connected to first and second arm members.

2. The windshield wiper system of claim 1, wherein the position of the first connecting member relative to the second connecting member changes based on the angular position of the pivoting wiper arm during a wiper stroke.

3. The windshield wiper system of claim 1, wherein the angular position of the pivoting wiper arm alters a height of the wiper blade during the wiper stroke such that an arc of a motion path of the wiper blade is reduced.

4. The windshield wiper system of claim 2, wherein the angular position of the pivoting wiper arm alters a height of the wiper blade during the wiper stroke such that an arc of a motion path of the wiper blade is reduced.

5. The windshield wiper system of claim 1, wherein the first connecting member and the second connecting member are coupled to each other by a link comprising an axis in a horizontal direction, wherein the first and second connecting members rotate around the axis during the motion path of the wiper arm.

6. The windshield wiper system of claim 1, wherein the wiper arm, wiper blade, connecting rod and swing link are aligned when the wiper blade is in a center position on the surface.

7. A vehicle comprising a windshield wiper system as claimed in claim 1.

8. The vehicle of claim 7, wherein the vehicle is a railway vehicle.

* * * * *